United States Patent Office 2,867,199
Patented Jan. 6, 1959

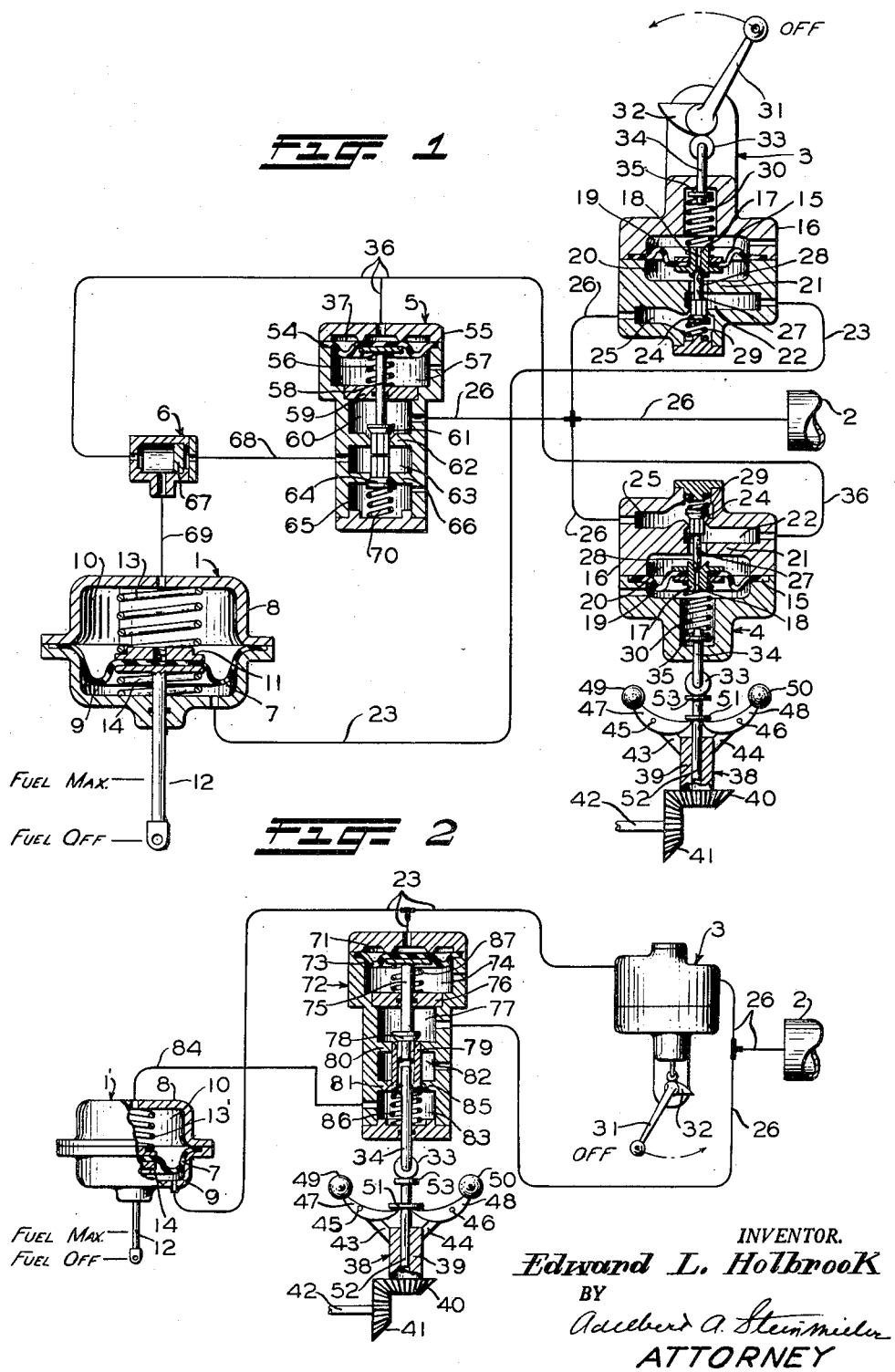

2,867,199

GOVERNOR CONTROL APPARATUS

Edward L. Holbrook, East McKeesport, Pa., assignor to Westinghouse Air Brake Company, Wilmerding, Pa., a corporation of Pennsylvania Application October 16, 1956, Serial No. 616,336

10 Claims. (Cl. 123—140)

This invention relates to governor control apparatus, and more particularly to an improved governor control apparatus of the fluid pressure controlled type for regulating speed of variable speed engines.

It is customary to employ on diesel engines (except on small diesel engines, which may employ mechanical governors) hydraulically-operated governors operative on the displacement and balancing principle, whereby a hydraulic on-off valve is initially opened by the operator and is then balanced at a desired engine speed by fly-ball governor action. With such an arrangement, the position of a fuel rack, once attained after some period of hunting, is maintained by a quantity of trapped fluid working against a spring-loaded piston. In order to minimize leakage, hunting and overcasting, the hydraulically-operated governor must be closely machined and the resulting device is expensive and difficult to maintain.

According to the invention, the improved governor control apparatus comprises an operator's control valve which is set manually to provide a desired engine speed, and which according to its setting provides gas (preferably compressed air) at a corresponding pressure in one control chamber of a double-acting fluid pressure operated actuator, which actuator is operated by such pressure toward a maximum fuel position for thereby causing a fuel rack to effect supply of fuel to the engine; and said control apparatus also comprises a fly-ball governor controlled valve which operates according to engine speed to provide gas (preferably compressed air) at a corresponding pressure in an opposing control chamber of the fuel rack actuator, such that operation of this actuator will be controlled according to the relative balancing of two control pressures, one corresponding to the desired engine speed and the other corresponding to actual engine speed. Upon variation in load, the fly-ball governor speed and hence the actual speed-controlled pressure will change, thereby causing the actuator to so control the fuel rack as to adjust the fuel supply to the engine in accordance with the changed load condition. The improved apparatus also preferably comprises "fail-safe" means so arranged as to cause operation of the actuator to a fuel off position in event of certain fluid pressure failures in the control system.

With the improved governor control apparatus, hereinafter to be more fully described, engine speed may be accurately maintained despite slight leakage from the pneumatic control system, "hunting" will be minimized, operation will be smoother, and the apparatus will be less expensive in initial cost and in maintenance cost than a governor control apparatus of the hydraulic type because in the improved apparatus such components as a gear oil pump, oil sump, spring-loaded accumulator, compensating needle valve, etc., are eliminated; and advantage may be taken of the compressed air usually readily available, such as on a diesel-electric locomotive, for purposes other than governor control.

Thus, the principal object of the invention is to provide an improved pneumatically controlled fuel supply governor for controlling speed of engines, especially of diesel engines, such as are used on diesel-electric locomotives to drive direct-current generators or are used in power plants where only one alternator supplies the line.

Other objects and advantages of the invention will become apparent from the following more detailed description of the invention and from the accompanying drawing wherein:

Fig. 1 is a diagrammatic view of a pneumatically operated fuel supply governor constructed according to the preferred embodiment of the invention for controlling speed of an engine; and Fig. 2 is a diagrammatic view of a pneumatically operated governor control apparatus constructed according to another embodiment of the invention.

DESCRIPTION—FIG. 1

As shown in this figure, the governor control apparatus embodying the invention comprises a pneumatically controlled, double-acting actuator 1 for controlling position of a fuel rack (not shown); a source, such as a reservoir 2, preferably containing compressed air; an operator's control valve device 3 manually operable to provide air at a selectable pressure in the actuator corresponding to desired engine speed; and a speed-controlled valve device 4 for supplying to said actuator air at a pressure corresponding to the actual engine speed. The apparatus also preferably comprises a relay valve device 5 and a double check valve device 6 which are provided to assure operation of the actuator 1 to cut off fuel supply to the engine in event of failures of the type hereinafter to be described; although, if preferred, said devices 5 and 6 may be eliminated.

The actuator 1 may comprise a flexible diaphragm 7 suitably clamped about its outer edge between sections of a casing 8 having at one side a chamber 9 and at the opposite side a chamber 10. The diaphragm 7 is operatively connected through the medium of a diaphragm follower assemblage 11 to a coaxially arranged control rod 12 that extends through chamber 9 and projects exteriorly of the casing 7; said control rod being adapted at its projecting end for connection to a fuel rack (not shown) that controls fuel supply to a diesel engine (not shown).

Diaphragm 7 is subject to pressure of fluid in chamber 10 and pressure of a helical spring 13 in said chamber acting in opposition to fluid pressure in chamber 9 and pressure of a helical bias spring 14 in the latter chamber. The bias effect of spring 13 somewhat exceeds the opposing bias effect of spring 14, such that the control rod 12 will be biased to a fuel off position, in which it is shown, when fluid pressures in the chambers 9 and 10 are equal, such as will occur when both chambers are vented. Two bias springs 13 and 14 are preferably provided so that a suitable stop (not shown) on the fuel rack (not shown) will define the fuel off position of the control rod 12.

The operator's control valve device 3 may comprise an annular flexible diaphragm 15 suitably clamped about its outer edge between sections of a casing 16 and about its inner edge between portions of a coaxially arranged combination diaphragm follower and valve seat member 17 having a through opening 18 that is open at one end to an atmospheric chamber 19 and at the opposite end to a chamber 20. Chamber 20 is constantly open by way of an opening through a casing partition 21 to a chamber 22 constantly connected by a pipe 23 to the chamber 9 of actuator 1. Arranged coaxially with the opening 18 in valve seat member 17 is a tapered supply valve 24 that is contained in a chamber 25 constantly open to reservoir 2 via a pipe 26, for controlling fluid flow from chamber 25 to chamber 22. Secured to the tapered, seating side of supply valve 24 is a valve stem 27 that projects, with substantial radial clearance, through the aforementioned opening in casing partition 21 and at its projecting end has an integrally formed, tapered release valve 28 that is adapted to seat against valve seat member 17 for preventing fluid flow from chamber 20 to chamber 19 via the opening 18. Supply valve 24 is biased to a closed position by a helical spring 29 in chamber 25; and valve seat member 17 is biased by a helical spring 30 in chamber 19 to a position in which said seat member engages the release valve 28. The minimum bias effect of spring 30 exceeds the light bias of spring 29 to assure that the supply valve 24 will be operatively unseated by pressure of spring 30 when the operator's control handle 31 is in an off position, in which it is shown, and so long as pressure in chamber 20 is less than a preselected value, such as 15 p. s. i., corresponding to the minimum force of spring 30.

The degree of compression of spring 30 may be increased from the minimum obtained with handle 31 in off position by turning handle 31 in a counter-clockwise direction, as indicated by the arrow, and thereby rotating a cam 32 which operatively compresses spring 30 through the medium of a roller follower 33, a rod 34 and a disc-shaped spring seat 35. By thus increasing the compression of spring 30 a desired degree of preload may be imposed on the diaphragm 15 and hence operatively maintain the supply valve 24 unseated until fluid pressure in chambers 22, 20 and 9 has increased to a value corresponding to the degree of such preload.

The speed-controlled valve device 4 may be identical with the valve device 3, except in the minor respects hereinafter noted; and consequently like reference numerals have been used to designate parts of valve device 4 which are identical with those of valve device 3. In valve device 4, chamber 25 is open to a branch of pipe 26 leading to reservoir 2; chamber 22 is open via a pipe 36 to a control chamber 37 of relay valve device 5; and the follower 33 (instead of being controlled by the cam 32 and handle 31) is controlled by a fly-ball type centrifugal speed responsive pressure device 38, in the manner now to be explained.

The device 38 may be of conventional design comprising a hollow shaft 39 rotatable by a bevel gear 40 which, in turn, is driven by a bevel gear 41 that is rotated by a drive shaft 42, which is operatively connected to the engine and is rotated at a speed corresponding to the speed of said engine. The device 38 further comprises two arms 43 and 44 rigidly secured to the hollow shaft 39 and normally projecting therefrom at an acute angle to the shaft axis. Pivotally connected to the arms 43 and 44 at 45 and 46, respectively, are arms 47 and 48. The arms 47 and 48 have at their respective outer ends balls 49 and 50 and at their respective inner ends engage the under side, as viewed in the drawing, of a collar 51 formed on a control stem 52 that adjacent its one end is axially slidable within the hollow shaft 39 and at its opposite end has an integrally formed plate 53 which is engaged by the follower 33 under action of the spring 30. Balls 49 and 50 are thrown farther outward as the speed of rotation of the drive shaft 42 and hence of the gears 41, 40 and hollow shaft 39 increases; the arms 47 and 48 pivoting at 45 and 46 for shifting the stem 52 upward and thereby operatively increasing the degree of compression of the spring 30 of device 4, so that the force of said spring will increase in proportion to actual engine speed.

The relay valve device 5 may comprise a flexible diaphragm 54 suitably clamped between sections of a casing 55 and subject at one side to pressure of fluid in chamber 37 and at the opposite side to pressure of a helical bias spring 56 in an atmospheric chamber 57. The diaphragm 54 is operatively connected through the medium of a diaphragm follower to a coaxially arranged actuating stem 58 that has sealing, slidably guided contact with the wall of an aligned bore through a casing partition 59 separating chamber 57 from a chamber 60 that is open to a branch of supply pipe 26. Coaxially attached to the actuating stem 58 and contained in chamber 60 is a safety or supply valve 61 that is adapted to seat against a tapered annular valve seat encircling a bore through a casing partition 62 separating chamber 60 from a chamber 63. The valve 61 has a fluted stem which projects into the chamber 63 and is adapted to abuttingly engage the fluted stem of a vent valve 64 that is contained in an atmospheric chamber 65 and controls communication between the chambers 63 and 65; said vent valve 64 being seatable against a tapered annular valve seat encircling a bore through a casing partition 66 separating chambers 63 and 65.

The double check valve device 6 may comprise, briefly, a double check valve 67 subject at one side to pressure of fluid in a branch of pipe 36 and at the opposite side to pressure of fluid in a pipe 68 leading to chamber 63 of relay valve device 5; said check valve 67 being operative to connect to a pipe 69, that leads to chamber 10 of the actuator 1, whichever one of the pipes 36 or 68 is charged with fluid at the preponderant pressure.

*Operation—Fig. 1*

Assume initially that the handle 31 of operator's control valve device 3 is in its off position; that the engine is stopped; and that the pipe 26 is vented, such as will occur if reservoir 2 is devoid of compressed air or pipe 26 is not connected to said reservoir. Under this condition, the supply valves 24 of valve devices 3 and 4 will be unseated and the release valves 28 of the respective valve devices will be seated. With chamber 37 of valve device 5 devoid of compressed air, supply valve 61 will be operatively unseated by action of spring 56, and vent valve 64 will be held seated by a helical bias spring 70 in chamber 65. Since chambers 9 and 10 of the actuator 1 are devoid of air under pressure, the control rod 12 will be biased to fuel off position due to previously explained preponderant bias of spring 13 over that of spring 14. Thus, under the assumed condition, the various components of the apparatus will be in the respective positions in which they are shown in Fig. 1.

To initially condition the governor control apparatus, the pipe 26 is connected to reservoir 2 and said reservoir is charged with compressed air. Some of such air will flow from reservoir 2 via one branch of pipe 26 past the unseated supply valve 24 of the speed-controlled valve device 4 to chamber 22 and thence via one branch of pipe 36 to chamber 37 of relay valve device 5; and when pressure in chamber 37 exceeds a certain value, such as 10 p. s. i. (lower than the aforementioned preselected value of 15 p. s. i. corresponding to the minimum compression of springs 30 of valve devices 3 and 4), diaphragm 54 will deflect against resistance of spring 56 for operatively seating supply valve 61 and unseating vent valve 64 against resistance of spring 70, and thereby venting pipe 68. Meanwhile, some air will flow through another branch of pipe 36 and, with pipe 68 vented, shift double check valve 67 rightward, as viewed in the drawing, and then flow via pipe 69 to chamber 10 in actuator 1.

Meanwhile, as air is thus supplied to pipe 36 it will also flow into chamber 20 of valve device 4 through the opening in casing partition 21; and when pressure in said chamber is substantially equal to the aforementioned preselected value, illustratively assumed as 15 p. s. i., diaphragm 15 of valve device 4 will be deflected downwardly, permitting spring 29 to seat the supply valve 24. With both valves 24 and 28 seated, air will be bottled up in chamber 20 and hence in pipe 36, relay valve chamber 37 and actuator chamber 10 at the illustrative 15 p. s. i.

Meanwhile, air will be supplied from reservoir 2 and via another branch of pipe 26, past unseated supply valve 24 of operator-controlled valve device 3 to pipe 23 and thence to chamber 9 of actuator 1, until air pressure in chamber 20 of device 3 increases to substantially the aforementioned preselected value illustratively assumed as 15 p. s. i.; whereupon, with valve 28 seated, valve 24 will be seated (in the manner just described in connection with valve device 3) for bottling up air in chamber 20 and hence in actuator chamber 9 at the illustrative 15 p. s. i.

Thus, with handle 31 of device 3 in off position and reservoir 2 charged, the supply valves 24 and release valves 28 of valve devices 3 and 4 will be seated, and vent valve 64 of relay valve device 5 will be unseated; and pressures in chambers 37 of device 5, and in the opposing chambers 9 and 10 of the actuator, will be charged to the illustrative 15 p. s. i. In view of the aforementioned preponderant bias effect of spring 13 over spring 14, the control rod 12 will be maintained in its fuel off position in which it is shown, throughout initial conditioning of the apparatus.

When starting the engine, the operator moves handle 31 in a counterclockwise direction, as viewed in Fig. 1, for thereby causing cam 32 to operatively further compress spring 30 and thereby unseat supply valve 24 for charging actuator chamber 9 via pipe 23 to cause diaphragm 7 to deflect upwardly and carry the control rod 12 from fuel off position toward fuel maximum position and thereby cause the fuel rack (not shown) to move to effect supply of fuel to the engine. After the engine has started, the operator moves handle 31 to a position corresponding to the engine speed desired for providing air at a corresponding pressure in the actuator chamber 9. As engine speed increases, the balls 49 and 50 of device 38 will be thrown farther outward by rotation of shaft 39 through the drive shaft 42 and gears 41 and 40. As balls 49 and 50 are thrown outward, the arms 47 and 48 will pivot at 45 and 46, respectively, and move stem 52 axially upward by engagement with collar 51 for operatively increasing the degree of compression of, and hence the force exerted by, spring 30 of device 4. This increased spring force will cause the supply valve 24 of device 4 to be operatively unseated through the medium of valve seat member 17, seated valve 28 and stem 27, for causing air under pressure to be admitted from reservoir 2 to chamber 37 and, via double check valve device 6, to actuator chamber 10. A point of equilibrium of opposing forces on diaphragm 7 will be reached, with the result that the engine will run at substantially a constant speed corresponding to the operator-selected pressure provided in chamber 9 and to the consequent position of the control rod 12, so long as engine load remains unchanged; it being noted that when pressure in each of the chambers 20 of the respective devices 3 and 4 has increased to the value corresponding to the degree of compression of their springs 30, the respective supply valves 24 will be reseated for cutting off further supply of air to the chambers 9 and 10.

If engine speed decreases due to an increase in load, the rotative speed of the balls 49 and 50 will be reduced, causing the force exerted by spring 30 of device 4 to be reduced; whereupon pressure of air in chamber 20 of device 4 will deflect diaphragm 15 downwardly, carrying valve seat member 17 away from the previously seated release valve 28 for releasing air from pipe 36 and actuator chamber 10 via opening 18 in valve seat member 17 and atmospheric chamber 19. Actuator diaphragm 7 will then be shifted upwardly for carrying control rod 12 toward fuel maximum position for increasing fuel supply to the engine, until a new equilibrium position of the diaphragm is attained in which fuel is supplied to the engine at a rate sufficient to maintain engine speed at a value sufficient to restore the air pressure in chamber 10 to that established in actuator chamber 9 by the operator controlled device 3.

If, on the other hand, load on the engine decreases, the consequent increase in engine speed will cause the balls 49 and 50 to rotate more rapidly and thus effect an increase in the effective force of spring 30 of device 4. This, in turn, will cause the supply valve 24 to be unseated for effecting an increase in pressure in actuator chamber 10 tending to move control rod 12 downwardly to reduce fuel supply to the engine until a new equilibrium position of control rod 12 is reached at which fuel will be supplied at a rate sufficient to provide the desired engine speed at which the pressure in chamber 10 is reduced to equilibrium with the pressure in chamber 9 of actuator 1.

To effect a reduction in engine speed, the control handle 31 is moved clockwise. In view of the consequent reduction in the effective force exerted by spring 30 on diaphragm 15 of device 3, said diaphragm will be deflected upwardly by pressure in chamber 20, causing valve seat member 17 to be carried away from the previously seated release valve 28. With valve 28 unseated, air will be released from actuator chamber 9 via chamber 20, opening 18 and atmospheric chamber 19 until pressure in chamber 20 is reduced sufficiently to cause spring 30 to reseat the valve seat member 17 against the release valve 28. This reduction in pressure in actuator chamber 9 will cause the control rod 12 to be shifted toward fuel off position by the momentarily higher pressure in chamber 10 for reducing fuel supply and thereby effecting a reduction in engine speed, which, in turn, will cause valve device 4 to operate in the above-described manner to effect a reduction in pressure in actuator chamber 10 until a new equilibrium position of the control rod 12 is attained corresponding to the reduced speed dictated by the reduced operator-selected pressure in actuator chamber 9.

The improved apparatus preferably embodies the relay valve device 5 and double check valve device 6 in order to provide a "fail-safe" feature if the speed-controlled valve device 4 should fail, such as by rupture of its diaphragm 15 or failure of its spring 30 or other failure which will reduce the pressure in pipe 36 below the illustrative preselected lower value of 10 p. s. i., as will now be shown. If pressure in pipe 36 and hence in chamber 37 of device 5 reduces below 10 p. s. i., spring 58 will shift diaphragm 54 upwardly for thereby unseating supply valve 61 and permitting vent valve 64 to be seated by spring 70. Under this condition, air at full reservoir pressure will flow from reservoir 2 via a branch of pipe 26 and past unseated valve 61 to pipe 68 and shift double check valve 67 leftward and then flow via pipe 69 to actuator chamber 10 for positively biasing the actuator diaphragm 7 and hence control rod 12 to fuel off position for shutting off fuel supply to the engine. Without such a "fail-safe" feature, it will be seen that a failure of the type described could cause the control rod 12 to be shifted to and remain in fuel maximum position by virtue of the otherwise unopposed fluid pressure in actuator chamber 9. If, however, this feature is not desired, the valve devices 5 and 6 may be eliminated, in which case pipe 36 would connect chamber 22 of device 4 directly to actuator chamber 10.

If the devices 5 and 6 are employed, however, it will be seen that as soon as pressure in pipe 36 and hence in chamber 37 is restored to a value exceeding the illustrative 10 p. s. i., diaphragm 54 will be shifted downwardly for operatively seating valve 61 and unseating vent valve 64, for thereby venting pipe 68 and thereby venting pipe 69 until the double check valve 67 is shifted rightward by any pressure then in pipe 36; whereupon operation of the actuator 1, and hence the actual speed of the engine, will be controlled according to the desired engine speed as determined by position of the handle 31. It will now be noted that when the apparatus is initially conditioned by the pipe 26 being connected to a charged reservoir 2, as above described, the control rod 12 will initially be biased to fuel-off position by air supplied from reservoir 2 by operation of relay valve device 5 and valve device 6; but that, as soon as pressure in pipe 36 exceeds 10 p. s. i., the valve devices 5 and 6 will operate to vent pipe 69 in the manner and to the extent just described.

*Description and operation—Fig. 2*

As shown in this figure, the apparatus constructed according to this embodiment of the invention differs from that shown in Fig. 1, briefly, in that the operator-controlled valve device 3 is manually operative to provide in pipe 23 and thereby in actuator chamber 9 and also in a chamber 71 of a self-lapping type relay valve device 72 fluid at a pressure corresponding to desired engine speed, and the speed-responsive device 38 acts directly on the valve device 72 to cause valve means thereof (hereinafter to be described) to regulate pressure in actuator chamber 10. Hence, components in Fig. 2 which may be identical with those shown in Fig. 1 have been identified by reference numerals identical with those in Fig. 1.

Valve device 72 comprises a flexible diaphragm 73 suitably clamped about its outer edge between sections of a casing and separating chamber 71 from an atmospheric chamber 74. The diaphragm 73 is operatively connected, through the medium of a diaphragm follower, to a coaxially arranged stem 75 which has sealing, slidably guided contact, intermediate its ends, with the wall of an aligned bore through a casing partition 76 separating chamber 74 from a supply chamber 77 constantly open to a branch of pipe 26. To the projecting end of stem 75 is coaxially attached a tapered supply valve 78 contained in chamber 77 and having a fluted stem slidable within an encircling annular plunger 79 which, in turn, is slidable within aligned bores through two casing partitions 80, 81 between which is an atmospheric chamber 82. Casing partition 80 separates the chambers 77, 82; and casing partition 81 separates the chamber 82 from a delivery chamber 83 constantly open via a pipe 84 to actuator chamber 10. Formed integrally with the plunger 79 and contained in chamber 83 is a tapered release valve 85 which is biased by a helical spring 86 in chamber 83 into seating contact with a tapered seat provided in casing partition 81 encircling the aforementioned bore therethrough. The rod 34, which is connected at one end to follower 33, projects upwardly through the casing and through chamber 83 and with substantial radial clearance into the circular opening in plunger 79 and is adapted at the opposite end for abutting contact with the fluted stem of supply valve 78.

The actuator 1' is identical with the actuator 1 of Fig. 1 except that the spring 13 is replaced by a stronger spring 13' for reasons hereinafter explained.

In operation, when the engine is stopped and pipe 26 is vented, the various components will assume the positions in which they are shown in Fig. 2. When the pipe 26 is connected to a charged reservoir 2 for initially conditioning the apparatus, pipe 23 and hence actuator chamber 9 will be charged, by operation of valve device 3, to the illustrative 15 p. s. i.; it being noted that the supply valve 78 will initially be held unseated by stem 75, initially permitting flow of reservoir air to the delivery chamber 83 via the bore in plunger 79 and thence to actuator chamber 10, but when pressure in pipe 23 and hence in chamber 71 exceeds the illustrative 10 p. s. i., as determined by the value of a helical spring 87 in chamber 74, diaphragm 73 will deflect and operatively seat supply valve 78 and then, through such seating, move the plunger 79 downwardly for unseating release valve 85 to vent chamber 10 via atmospheric chamber 82. Spring 13' of actuator 1' exerts sufficient bias, with chamber 10 vented, to maintain control rod 12 in fuel off position against the combined pressures of spring 14 and of fluid (at 15 p. s. i.) in chamber 9.

If preferred, however, the supply valve 78 may be separate from, rather than attached to, the stem 75 and a spring (not shown) provided in chamber 77 to bias said valve into seating contact with the plunger 79. In this event, the valve 78 would act as a check valve to prevent flow of reservoir air to the chamber 10 during initial conditioning of the apparatus.

When, after the engine has been started, the operator's handle 31 is moved from its off position to provide in pipe 23 air at a pressure (above the illustrative 15 p. s. i.) corresponding to desired engine speed, such air will flow via branches of pipe 23 to chamber 71 of device 72 and also to actuator chamber 9, causing the control rod 12 to be shifted upwardly, as shown in the drawing, toward fuel maximum position against pressure of spring 13' and thereby effect supply of fuel to the engine; this, in turn, will cause the shaft 42 to rotate, and hence balls 49 and 50 to revolve, with the result that the arms 47 and 48 will move stem 52 upwardly for operatively causing the upper end of rod 34 to abut the stem of supply valve 78 and tend to shift said supply valve upwardly against the opposing force operatively exerted thereon by the diaphragm 73. When engine speed has increased sufficiently, supply valve 78 will thus be moved upwardly and successively permit the plunger 79 to follow until release valve 85 is fully seated by spring 86 and then cause supply valve 78 to be unseated from the plunger; whereupon air will flow from reservoir 2 via chamber 77 and past unseated valve 78 and along the central bore of the plunger 79 to chamber 83 and thence via pipe 84 to actuator chamber 10. Such supply of air to chamber 10, which tends to cause a reduction in fuel supply to the engine, will continue until a point of equilibrium of opposing forces on diaphragm 7 is reached and the position of the control rod 12 is adjusted to effect fuel supply to the engine at a rate sufficient to run the engine at a constant speed corresponding to the operator-selected pressure provided in chambers 71 and 9, at which time the rod 34 will abuttingly engage but not unseat the supply valve 78 and both valves 78 and 85 will be seated, so long as load remains constant.

It will be apparent that, so long as the position of handle 31 remains unchanged, the self-lapping relay type valve device 72 will operate, in event reduced load causes an increase in engine speed, to effect supply of fluid under pressure to actuator chamber 10 via supply valve 78 (which will be operatively unseated by rod 34 as above described) and if increased load causes a reduction in engine speed, said valve device 72 will operate to effect release of fluid under pressure from chamber 10 via release valve 85 (which will be operatively unseated by stem 75, seated valve 78 and plunger 79). Upon such changes in load, the position of the control rod 12 will be readjusted to so regulate fuel supply as to maintain actual engine speed at a value corresponding to the pressure provided in pipe 23 and corresponding to operator-selected speed.

In event of failure of air pressure for any cause in pipe 23, the actuator diaphragm 7 will be deflected by spring 13' and any air pressure then in chamber 10 to shift the control rod 12 to fuel-off position.

Having now described the invention, what I claim as new and desire to secure by Letters Patent, is:

1. Governor apparatus for the fuel control device of a variable speed engine, said apparatus comprising a double-acting actuator for the fuel control device operative responsively, according as the one or the other of two opposing fluid pressures predominates, in a fuel increasing direction or in a fuel decreasing direction, respectively, and operative to maintain a given fuel supply position of the fuel control device when the said pressures are in substantial equilibrium; operator-controlled valve means for controlling the said one pressure to select a desired speed of the engine; valve means operative responsively to engine speed for controlling the said other pressure in accordance with the actual engine speed; and means responsive to reduction of one of the opposing pressures below a certain low value for altering the relation of the pressures acting in said actuator so as to cause operation of the actuator in said fuel decreasing direction to a position for completely shutting off fuel supply to the engine.

2. A governor control apparatus for a fuel burning variable speed engine, said apparatus comprising double-acting actuator means comprising a movable abutment subject to two opposing control pressures and control rod means positively connected to said movable abutment for positioning thereby to control fuel supply to the engine, said movable abutment being responsive to an increase and decrease, respectively, in one of said control pressures relative to the other of said control pressures to position the control rod to correspondingly effect an increase and decrease, respectively, in such fuel supply, operator-controlled valve means for preselecting a value of said one control pressure corresponding to a desired engine speed, speed-responsive means driven by said engine, and other valve means controlled by said speed-responsive means and operative to control the value of said other control pressure according to actual engine speed, said movable abutment being responsive to substantial equalization of said opposing control pressures to so position said control rod means as to regulate fuel supply to provide a substantially constant engine speed corresponding to the value of said one control pressure.

3. A governor control apparatus for a fuel burning variable speed engine, said apparatus comprising double-acting actuator means subject to two opposing pressures and responsive to an increase in one of said pressures relative to the other of said pressures to effect an increase in fuel supply to the engine and responsive to substantial balancing of said pressures to adjust such fuel supply according to said one pressure and responsive to a subsequent increase in said other pressure relative to said one pressure to effect a decrease in fuel supply to the engine, operator-controlled valve means for controlling said one pressure, speed-controlled means for effecting an increase in said other pressure responsively to an increase in speed resultant from such increase in fuel supply to the engine, and means controlled by said other pressure as provided by said speed-controlled means and operative only when said other pressure as thus provided is below a preselected value to effect a substantial increase in said other pressure independently of said speed-controlled means and remove control of said other pressure from said speed-controlled means for thereby causing said actuator means to operate to effect a complete cut-off of fuel supply to the engine.

4. A governor control apparatus for a fuel burning variable speed engine, said apparatus comprising, in combination with a source of compressed air, a control rod for controlling according to its position the supply of fuel to the engine, double-acting actuator means having two chambers and responsive to preponderance in air pressure in one of said chambers over an opposing air pressure in the other of said chambers to position said control rod for effecting an increase in fuel supply to the engine and responsive to preponderance in air pressure in said other chamber over that in said one chamber to position said control rod for effecting a decrease in fuel supply to the engine and responsive to substantial balancing of the pressures in said chambers to position said control rod for regulating fuel supply at a rate corresponding to pressure in said one chamber, operator-controlled valve means for supplying from said source to said one chamber air at a selectable pressure corresponding to a desired engine speed, a first conduit, speed-desponsive means driven by the engine, speed-controlled valve means controlled by said speed-responsive means for supplying from said source to said first conduit air at a pressure corresponding to actual engine speed, a second conduit, other valve means for selectively connecting to said other chamber whichever one of said conduits is charged with air at the preponderant pressure, and third valve means for selectively venting said second conduit or connecting said source to said second conduit according as pressure in said first conduit exceeds or is less than a preselected low value.

5. A governor control apparatus for a fuel burning variable speed engine, said apparatus comprising, in combination with a source of compressed air, a control rod for controlling according to its position the supply of fuel to the engine, double-acting actuator means having two chambers and responsive to preponderance in air pressure in one of said chambers over an opposing air pressure in the other of said chambers to position said control rod for effecting an increase in fuel supply to the engine and responsive to preponderance in air pressure in said other chamber over that in said one chamber to position said control rod for effecting a decrease in fuel supply to the engine and responsive to substantial balancing of the said pressures in said chambers to position said control rod for regulating fuel supply at a rate corresponding to pressure in said one chamber, operator-controlled valve means having a handle operable in an off position to provide in said one chamber from said source air at a preselected minimum pressure corresponding to a normal shut-off condition of the engine and operable from off position into a zone for providing in said one chamber from said source air at a pressure, exceeding said preselected minimum pressure, corresponding to desired engine speed and corresponding to the degree of movement into said zone, a first conduit, speed-responsive means driven by the engine, speed-controlled valve means controlled by said speed responsive means and normally operative when the engine is stopped to provide in said first conduit from said source air at substantially the preselected minimum pressure and operative when the engine is running to provide in said first conduit from said source air at a pressure, exceeding said preselected minimum pressure corresponding to actual engine speed, a second conduit, other valve means for selectively connecting to said other chamber whichever one of said conduits is charged with air at the preponderant pressure, and third valve means for selectively venting said second conduit or connecting said source to said second conduit according as pressure in said first conduit exceeds or is less than a chosen pressure, lower than said preselected minimum pressure, for assuring that, in event of failure of supply of air to said first conduit while said source is charged to above said preselected minimum pressure, said actuator means will be operated to positively effect a shut-off of fuel supply to the engine.

6. A governor control apparatus for a fuel burning variable speed engine, said apparatus comprising, in combination with a source of compressed air, double acting actuator means having two chambers and responsive to preponderance in air pressure in one of said chambers over an opposing air pressure in the other of said chambers for effecting an increase in fuel supply to the engine and responsive to substantial balancing of the pressures in said chambers for effecting a rate of fuel supply to the engine corresponding to pressure in said one chamber, operator-controlled valve means for providing in said one chamber from said source air at a selectable pressure corresponding to desired engine speed, speed-responsive means comprising means rotatably driven by the engine and operative by centrifugal force to exert a thrust force corresponding to actual engine speed, and speed-controlled valve means comprising a supply valve, a release valve and a movable abutment subject opposingly to pressure of air in said other chamber and to pressure of a control spring which is compressible by said thrust force for increasing control spring pressure, said supply valve and release valve being selectively unseatable by said movable abutment to provide in said other chamber air at a pressure which balances the pressure of said control spring.

7. A governor control apparatus for a fuel burning variable speed engine, said apparatus comprising double-acting actuator means subject to two opposing pressures and responsive to an increase in one of said pressures relative to the other of said pressures to effect an increase in fuel supply to the engine and responsive to substantial balancing of said pressures to adjust such fuel supply according to said one pressure, operator-controlled valve means for effecting an increase in said one pressure, speed-responsive means driven by said engine for providing a speed-indicative pressure corresponding to actual engine speed, and self-lapping valve means controlled by said speed-indicative pressure opposing said one pressure and operative to so regulate said other pressure that the effect of said speed-indicative pressure will balance the opposing effect of said one pressure for causing the engine to run at a speed corresponding to said one pressure.

8. A governor control apparatus for a fuel burning variable speed engine, said apparatus comprising, in combination with a source of compressed air, double-acting actuator means having two chambers and responsive to an increase in air pressure in one of said chambers relative to an opposing air pressure in the other of said chambers for effecting an increase in fuel supply to the engine and responsive to substantial balancing of the pressures in said chambers for effecting a rate of fuel supply to the engine corresponding to pressure in said one chamber, operator-controlled valve means for providing in said one chamber from said source air at a pressure corresponding to desired engine-speed, thrust-transmitting means including a rod, speed-responsive means comprising means rotatably driven by the engine and operative by centrifugal force to exert a thrust force through said rod corresponding to actual engine speed, and a self-lapping valve device comprising a compartmented casing containing a supply valve controlling connection of the source with said other chamber, an annular plunger slidable within the casing and against one end of which said supply valve is seatable, a release valve formed integrally with the other end of the plunger and controlling another connection of said other chamber with the atmosphere, means biasing said release valve to a seated position against a partition in said casing, and movable abutment means operable by pressure in said one chamber for operatively exerting a force on said supply valve for seating same and through the medium of said plunger unseating said release valve, said rod projecting with substantial radial clearance into the annular opening in the plunger and being adapted to apply to said supply valve an unseating force opposing the force exerted by said movable abutment means, said supply valve and release valve being concurrently seatable when the force exerted by said movable abutment means is substantially balanced by the force exerted by said thrust-transmitting means through said rod for thereby bottling up air in said other chamber at a pressure corresponding to the speed dictated by said one pressure.

9. Governor apparatus for the fuel control device of a variable speed engine, said apparatus comprising a double-acting actuator for the fuel control device operative responsively, according as one or the other two opposing fluid pressures predominates, in a fuel increasing direction or in a fuel decreasing direction, respectively, and operative to maintain a given fuel supply position of the fuel control device when said pressures are in substantial equilibrium; operator-controlled valve means for controlling the said one pressure to select a desired speed of the engine; valve means operative responsively to engine speed for controlling the said other pressure in accordance with the actual engine speed; and means for biasing said actuator to a position for completely shutting off the fuel supply to the engine when the said pressures are in exact equilibrium.

10. A governor control apparatus for a fuel burning variable speed engine, said apparatus comprising double acting actuator means comprising a movable abutment subject to two opposing control pressures and control rod means positively connected to said movable abutment for positioning thereby to control fuel supply to the engine, said movable abutment being responsive to an increase and decrease, respectively, in one of said control pressures relative to the other of said control pressures to position the control rod to correspondingly effect an increase and decrease, respectively, in such fuel supply, operator-controlled valve means for varying said one control pressure, speed-responsive means driven by said engine, other valve means controlled by said speed-responsive means and operative to vary said other control pressure according to variations in engine speed, said movable abutment being responsive to substantial equalization of said opposing control pressures to so position said control rod means as to regulate fuel supply to provide a substantially constant engine speed corresponding to the value of said one control pressure, and means controlled by said other control pressure and operative only when said other control pressure drops below a preselected value to effect a substantial increase in said other control pressure independently of said other valve means and concurrently remove control of said other control pressure from said other valve means for thereby assuring operation of said control rod means to a position for completely shutting off fuel supply to the engine.

References Cited in the file of this patent
UNITED STATES PATENTS
2,470,382    Vanni  ----------------  May 17, 1949